US012600274B2

(12) United States Patent (10) Patent No.: US 12,600,274 B2

Liu (45) Date of Patent: Apr. 14, 2026

(54) CONNECTING ASSEMBLY AND BABY SEAT

(71) Applicant: WONDERLAND SWITZERLAND AG, Steinhausen (CH)

(72) Inventor: Zujian Liu, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 97 days.

(21) Appl. No.: 18/572,558

(22) PCT Filed: Jul. 29, 2022

(86) PCT No.: PCT/EP2022/071424

§ 371 (c)(1),
(2) Date: Dec. 20, 2023

(87) PCT Pub. No.: WO2023/006983

PCT Pub. Date: Feb. 2, 2023

(65) Prior Publication Data

US 2024/0336174 A1      Oct. 10, 2024

(30) Foreign Application Priority Data

Jul. 30, 2021    (CN) .......................... 202110872990.8

(51) Int. Cl.
B60N 2/28 (2006.01)
(52) U.S. Cl.
CPC .................................. B60N 2/2887 (2013.01)
(58) Field of Classification Search
CPC .................................................... B60N 2/2887
(Continued)

(56) References Cited

U.S. PATENT DOCUMENTS 7,618,093 B2 * 11/2009 Hung-Chung ....... B60N 2/2887
297/256.16
2006/0006714 A1 * 1/2006 Van Geer ............. B60N 2/2824
297/256.16
(Continued)

FOREIGN PATENT DOCUMENTS

CN 103465805 A * 12/2013 ........... B60N 2/2887
CN 204978315 U * 1/2016 ........... B60N 2/2887
(Continued)

OTHER PUBLICATIONS

First Office Action in Corresponding Japanese Application No. 2024-505142, dated Jan. 24, 2025; 8 pgs.
(Continued)

*Primary Examiner* — Milton Nelson, Jr.
(74) *Attorney, Agent, or Firm* — HAUPTMAN HAM, LLP

(57) ABSTRACT

The present disclosure provides a connecting assembly including a frame body for connecting with a seat body and a connector for connecting with a car seat. The connector is movably connected with the frame body, and the connector is movable relative to the frame body such that the connector has a work position and a reset position. The connector angles with the frame body when the connector is in the work position, while the connector flushes with the frame body when the connector is in the reset position. By virtue of the motion of the connector relative to the frame body between the work position and the reset position, the seat body, to which the frame body is connected, is allowed to move downwards relative to the connector. The present disclosure further provides a baby carriage frame having the connecting assembly.

22 Claims, 7 Drawing Sheets

(58) Field of Classification Search
USPC ............................................. 297/256.16, 253
See application file for complete search history.

(56) References Cited

U.S. PATENT DOCUMENTS

| | | | | |
|---|---|---|---|---|
| 2008/0277984 A1* | 11/2008 | Carine | ................... | B60N 2/289 |
| | | | | 297/253 |
| 2020/0269732 A1 | 8/2020 | Bendjellal et al. | | |

FOREIGN PATENT DOCUMENTS

| | | | |
|---|---|---|---|
| CN | 109624800 | A | 4/2019 |
| CN | 110562103 | A | 12/2019 |
| CN | 111332167 | A | 6/2020 |
| CN | 213082968 | U | 4/2021 |
| DE | 102013007707 | A1 | 12/2013 |
| EP | 3670252 | A1 | 6/2020 |
| FR | 3006952 | A3 | 12/2014 |
| JP | 2008540249 | A | 11/2008 |
| JP | 2013516352 | A | 5/2013 |
| KR | 101982761 | B1 | 5/2019 |
| WO | 2018126713 | A1 | 7/2018 |
| WO | 2021030243 | A1 | 2/2021 |

OTHER PUBLICATIONS

Search Report in Corresponding Japanese Patent Application No. 2024-505142, dated Jan. 22, 2025; 47 pgs.
International Search Report issued in corresponding International Application No. PCT/EP2022/071424, dated Nov. 14, 2022, pp. 1-3, European Patent Office, Rijswijk, Netherlands.
Taiwan First Office Action issued in corresponding Taiwan Application No. 111128536, dated May 18, 2023, pp. 1-8.
First Office Action in Corresponding Chinese Application No. 202110872990.8, dated Jan. 19, 2026; 15 pgs.

* cited by examiner

100

100

100

CONNECTING ASSEMBLY AND BABY SEAT

CROSS REFERENCE

This application is a National Stage application of PCT/ EP2022/071424, filed on Jul. 29, 2022, which claims the benefit of Chinese Application No. 202110872990.8, filed on Jul. 30, 2021, both of which are incorporated herein by reference in their entirety.

TECHNICAL FIELD

The present disclosure relates to a baby safety seat, and in particular to a connecting assembly and a baby seat.

BACKGROUND

In daily life, baby carriages have become more and more common, and provide families with safe environment in sight as much as possible while providing convenience.

Baby safety seats have become indispensable carriers for babies to travel. Generally, a baby safety seat is equipped with an ISOFIX connector for connecting with a car. The common ISOFIX connector is generally hard-connected to the car, that is, the ISOFIX connector is fixedly connected with the seat body such that the seat body and the ISOFIX connector may remain at the same height position after the ISOFIX connector is connected with the car, which makes it difficult to lower the seat body, resulting in that the overall height of the seat body is relative high and that there is an increased possibility for the baby's head to collide with the roof of the car after the baby is seated.

For overcoming the above problem, it is necessary to provide a connecting assembly and a baby seat.

SUMMARY

An objective of the present disclosure is to provide a connecting assembly, which enables to flexibly adjust the height of the seat body down after connection and has the advantage of simple structure.

Another objective of the present disclosure is to provide a baby seat having the above-mentioned connecting assembly, which has the advantage of simple structure.

To achieve the above objectives, the present disclosure provides a connecting assembly. The connecting assembly includes a frame body for connecting with a seat body and a connector for connecting with a car seat. The connector is movably connected with the frame body. The connector is movably connected with the frame body, so that the connector can be moved relative to the frame body so as to have a work position and a reset position. The connector angles with the frame body when the connector is in the work position; while the connector flushes with the frame body when the connector is in the reset position. By virtue of the motion of the connector relative to the frame body between the work position and the reset position, the seat body, to which the frame body is connected, is allowed to move downwards relative to the connector.

Preferably, the connector is flexibly connected with the frame body.

Preferably, the connector is pivotally connected with the frame body.

Specifically, the connecting assembly further includes a pivot shaft, the frame body has an outer frame body, the connector has a connecting portion, and the connecting portion is pivotally connected with the outer frame body through the pivot shaft.

Specifically, the connecting assembly further includes a bushing provided between the outer frame body and the connector.

Specifically, an engagement opening is provided on the outer frame body, a positioning protrusion extends outwardly from the bushing to correspond to the engagement opening, and the positioning protrusion is engaged with the engagement opening.

Specifically, the connecting assembly further includes a limiting assembly for limiting the connector which is in the work position.

Specifically, the limiting assembly includes a first abutment portion and a second abutment portion, the connector has the first abutment portion, while the bushing extends toward the connector to form the second abutment portion. When the connector is in the work position, the first abutment portion abuts against an inner wall of the outer frame body, and the second abutment portion abuts against an outer wall of the connector.

Specifically, an end of the pivot shaft extends radially outwardly to form an engagement lug, the connector is provided with a pivot hole through which the pivot shaft passes, and a side of the pivot hole is provided with an engagement hole corresponding to the engagement lug.

Specifically, the engagement lugs are symmetrically arranged on both sides of the pivot shaft, and the engagement holes are symmetrically provided on both sides of the pivot hole.

Specifically, the connecting assembly further includes a locking mechanism, and the frame body further includes an inner frame body located on an inner side of the outer frame body, the inner frame body is movable relative to the outer frame body along a length direction of the outer frame body, and the locking mechanism is used to lock a relative position between the inner frame body and the outer frame body.

Specifically, the inner frame body is provided with a guide hole arranged along a sliding direction of the inner frame body, and the pivot shaft inserts in the guide hole (guild slot) and is slidably arranged in the guide hole.

Specifically, the locking mechanism includes a driving assembly and a locking member, the driving assembly is mounted on the inner frame body, the outer frame body are provided with a plurality of locking holes along the length direction thereof, the locking member inserts in the inner frame body and extends towards the locking hole, and that the locking member extends into any one of the locking holes under control of the driving assembly so as to lock the relative position between the inner frame body and the outer frame body.

Specifically, the driving assembly includes an operating member, an elastic member and a driving plate, the elastic member is arranged on the locking member, the elastic member provides an elastic force for permanently forcing the locking member to extend into the locking hole, one end of the driving plate is connected with the operating member, the other end of the driving plate is disposed with an oblique hole, the locking member has a guide column extending into the oblique hole. And, by pulling the operating member, the guide column can slide in the oblique hole and drive the locking member against an elastic force of the elastic member so as to exit the locking hole.

Specifically, the locking members are symmetrically arranged, and the elastic member is abutted between the two locking members in an elastically compressed manner.

Specifically, the oblique holes are symmetrically arranged, and the guide columns are symmetrically arranged.

Preferably, the connector is elastically connected with the frame body through an elastic member.

Preferably, the connector is an ISOFIX connector.

Specifically, the connecting assembly further includes a locking assembly, and the locking assembly provides an elastic force for permanently forcing the connector to turn from the work position to the reset position.

Specifically, the locking assembly includes a fixing member and an elastic element, an end of the fixing member is fixed to the connector, the elastic element is connected with the fixing member, the elastic element is connected with the pivot shaft, and the elastic element provides an elastic force for permanently forcing the connector to turn from the work position to the reset position.

Specifically, the elastic element includes a connecting main body and a winding portion, the connecting main body is connected with the fixing member, the winding portion is connected with the connecting main body, and the winding portion wraps outside the pivot shaft and provides an elastic force for rotating the pivot shaft.

Specifically, the elastic element has an elastic sheet structure.

In comparison with the prior art, the connecting assembly of the present disclosure is provided with a frame body for connecting with a seat body and a connector for connecting with a car seat, wherein the connector is movably connected with the frame body, that is, a relative movement can be made between the connector and the frame body, and the connector may be moved relative to the frame body to have a work position and a reset position, the connector is movable relative to the frame body between the work position and the reset position; the connector angles with the frame body when the connector is in the work position, such that the seat body, to which the frame body is connected, is allowed to move downwards relative to the connector, that is, the connector is allowed to be higher than the frame body, so as to overcome the hard connection between the connecting assembly and the car in the prior art. After the baby is seated, the seat body can be moved down by a certain distance relative to the connector under the baby's gravity, so that the baby's head can be prevented from colliding with the roof of the car, thereby achieving a protection effect. When the connector is in the reset position, the connector flushes with the frame body, so as to achieve the purpose of reset and storage.

In order to achieve the above objectives, the present disclosure also provides a baby seat, which includes a seat body and the above-mentioned connecting assembly, and the frame body is connected with the seat body.

In comparison with the prior art, since the baby seat of the present disclosure is provided with the connecting assembly, and the connecting assembly can prevent the baby's head from colliding with the roof of the car, so that the protection effect is achieved.

DETAILED DESCRIPTION

In order to detailedly describe the technical contents, structural features of the present disclosure and the effects achieved by the same, specific descriptions are given below in detail in conjunction with the embodiments with reference to the accompanying drawings.

Figure 1:
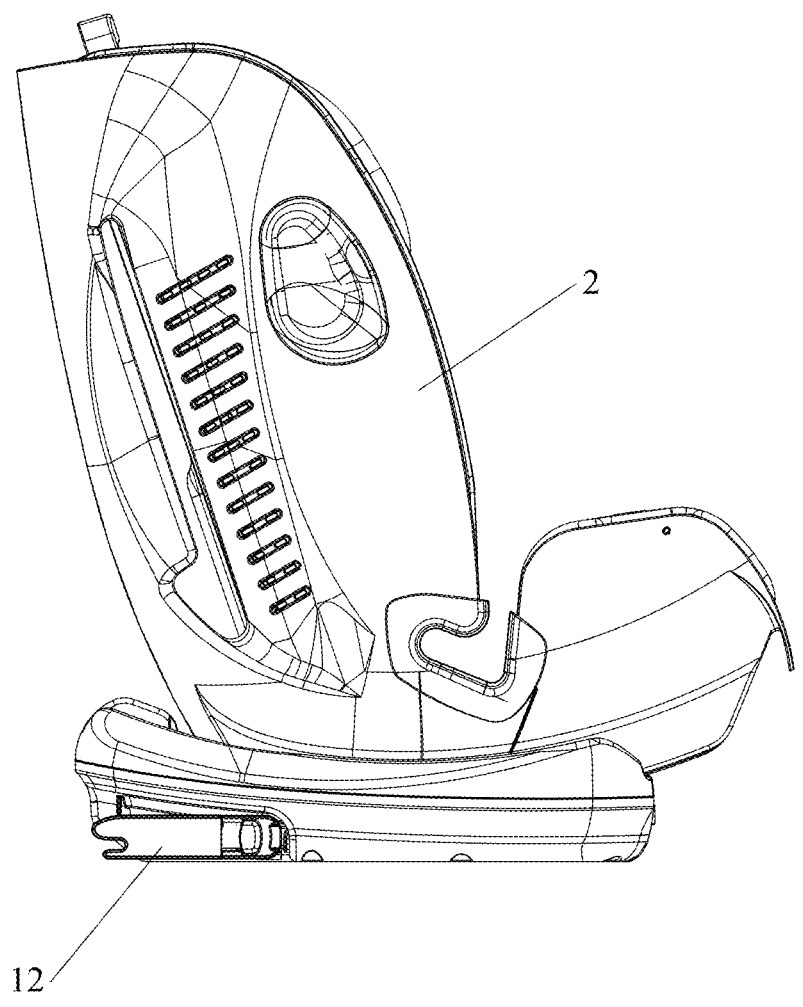
FIG. 1 is a schematic structural view of a baby seat of the present disclosure, in which a connector in a retracted state.
Figure 2:
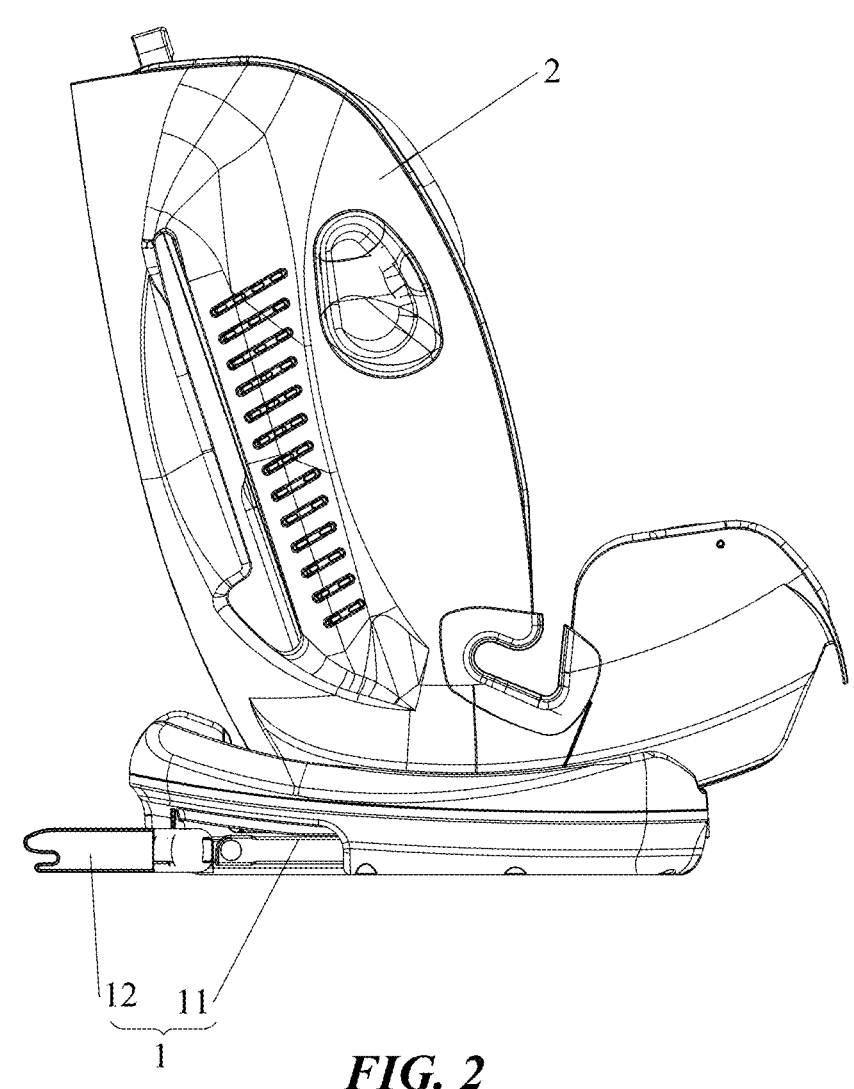
FIG. 2 is a schematic structural view of the baby seat of the present disclosure, in which the connector is in an extended state and is in a reset position relative to a frame body.
Figure 3:
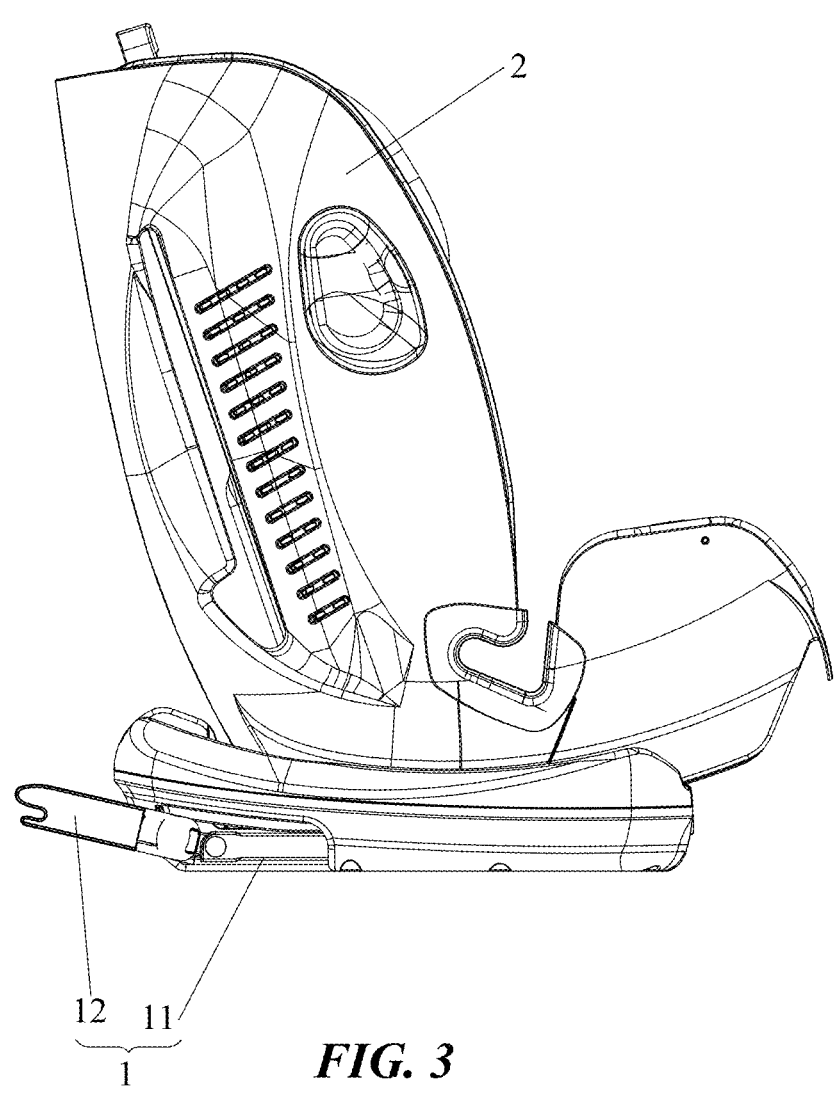
FIG. 3 is a schematic structural view of the baby seat of the present disclosure, in which the connector is in an extended state and is in a work position relative to the frame body.

As shown in FIG. 1 to FIG. 3, the present disclosure provides a baby seat 100, including a seat body 2 and a connecting assembly 1, a frame body 11 is provided below the seat body 2, and the frame body 11 is connected with the bottom of seat body 2. The connecting assembly 1 includes the frame body 11 for connecting with the seat body 2 and a connector 12 for connecting with the car seat, and the connector 12 is movably connected with the frame body 11. Preferably, there is a flexible connection between the connector 12 and the frame body 11. Herein, the term "flexible connection" is also called as "pliable connection" or "bendable connection", which is a connection mode to allow connecting portion 121 to be axially stretched, folded, and moved by a certain amount of displacement in a direction perpendicular to the axial direction. That is, the connector 12 is movable relative to the frame body 11. The connector 12 may be moved relative to the frame body 11 to have a work position (as shown in FIG. 3) and a reset position (as shown in FIG. 2), and that the connector 12 is movable relative to the frame body 11 between the work position and the reset position. When the connector 12 is in the work position, the connector 12 angles with the frame body 11 to allow the seat body 2 (to which the frame body 11 is connected) to descend relative to the connector 12, that is, the connector 12 is allowed to be higher than the frame body 11, which overcomes the "hard connection (rigid connection)" between the connecting assembly 1 and the car body in the prior art. After the baby is seated, the seat body 2 can sink a certain distance relative to the connector 12 under the baby's gravity, as shown in FIG. 3, which may prevent the baby's head from colliding with the roof of the car and thereby may achieve a protection effect. When the connector 12 is in the reset position, the connector 12 flushes with the frame body 11, so as to achieve the purpose of reset and storage. In an embodiment, the connector 12 is an ISOFIX connector, but is not limited thereto. More specifical features are as follows.

The connector 12 is elastically connected with the frame body 11 through an elastic member (not shown in the drawings), and the elastic member may be a soft plastic part or a spring or the like. As shown in FIG. 4 to FIG. 10, in an embodiment, the connector 12 is pivotally connected with the frame body 11, and the connector 12 may be rotated relative to the frame body 11. Specifically, the connecting assembly 1 further includes a pivot shaft 13 and a bushing 14. The frame body 11 has an outer frame body 111 which includes a longitudinal bar 1111 and a transverse bar 1112. Two longitudinal bars 1111 can be provided. The two longitudinal bars 1111 are spaced and symmetrically arranged along the left-right direction of the frame body 11. Each of the two longitudinal bars 1111 is connected pivotally with a connector 12 on the rear end, such that the two connectors 12 are symmetrically arranged. Each connector 12 has a connecting portion 121 with a short rod configuration. The connecting portion 121 extends into the outer frame body 111 and is pivotally connected with the outer frame body 111 through the pivot shaft 13. Here, only one pivot shaft 13 is provided, which is mounted laterally between the two longitudinal bars 1111, and the pivot shaft 13 is inserted between the two longitudinal bars 1111 of the outer frame body 111 and the connecting portions 121 of the two connector 12. The pivot shaft 13 forms a rotation shaft around which the two connectors 12 rotate relative to the two longitudinal bars 1111. The bushing 14 is provided between the outer frame body 111 and the connecting portion 121 of the connector 12, and the bushing 14 is sleeved on the connector 12. The arrangement of the bushing 14 can prevent rigid collision of metals between the connector 12 and the outer frame body 111 when the both are rotated with each other, so as to achieve the effect of protection. The outer frame body 111 is provided with an engagement opening 1113, and a positioning protrusion 141 extends outwardly from the bushing 14 to correspond to the engagement opening 1113. The positioning protrusion 141 is engaged with the engagement opening 1113. The bushing 14 is mounted in the outer frame body 111 by the engagement between the positioning protrusion 141 and the engagement opening 1113.

As shown in FIG. 4 to FIG. 10, the connecting assembly 1 further includes a limiting assembly for limiting the connector 12 which is in the work position. When the connector 12 is moved to the work positioning, the limiting assembly blocks any further movement of the connector and limits it in a extreme position. Specifically, the limiting assembly includes a first abutment portion 151 and a second abutment portion 152. The connecting portion 121 of the connector 12 has the first abutment portion 151, and bushing 14 extends toward the connector 12 to form the second abutment portion 152. When the connector 12 is in the work position, the first abutment portion 151 abuts against an inner wall of the outer frame body 111, and the second abutment portion 152 abuts against an outer wall of the connector 12, thereby restricting the rotation of the connector 12 by virtue of abutting.

As shown in FIG. 4 to FIG. 10, an end of the pivot shaft 13 extends radially outwardly to form an engagement lug 131, and the connector 12 is provided with a pivot hole 122 through which the pivot shaft 13 passes. A side of the pivot hole 122 is provided with an engagement hole 123 corresponding to the engagement lug 131. During installation, the pivot shaft 13 is inserted in the pivot hole 122, and the engagement lug 131 is engaged with the engagement hole 123, so as to achieve the fixation between the connector 12 and the pivot shaft 13 and to realize a synchronous rotation. Preferably, the engagement lugs 131 are symmetrically arranged on both sides of the pivot shaft 13, and the engagement holes 123 are symmetrically arranged on both sides of the pivot hole 122. It can be understood that the engagement lug 131 can also be omitted according to the actual situations, and that the transverse bar 1112 is directly connected between the two connectors 12, which can also provide effect of synchronization.

Figure 4:
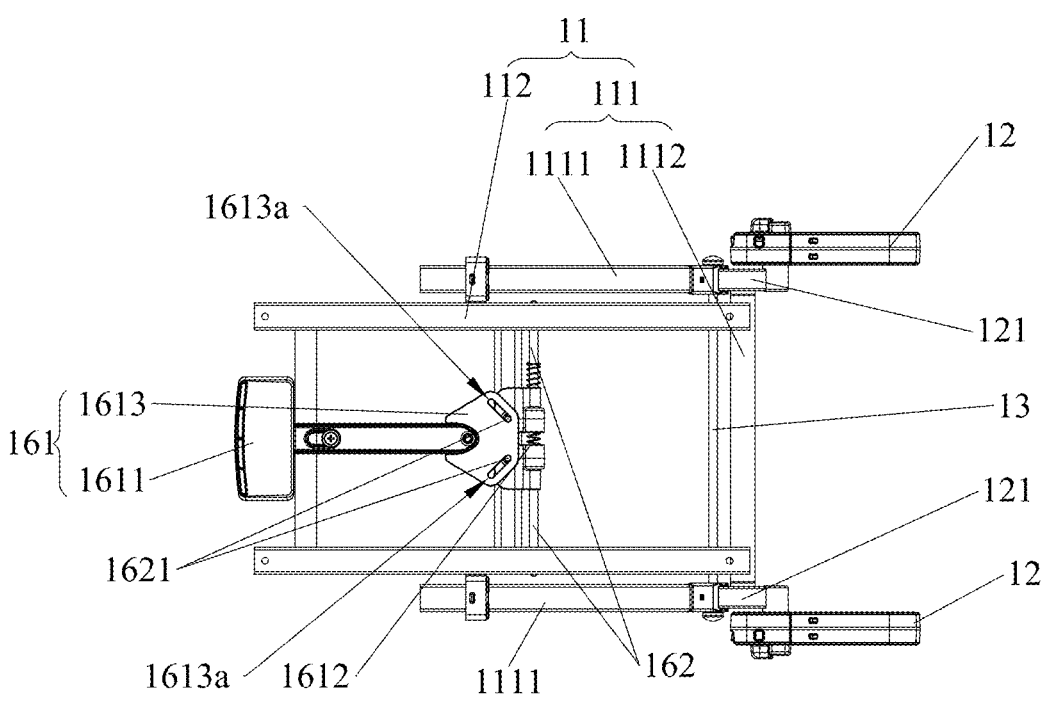
FIG. 4 is a schematic structural view of the connecting assembly of the present disclosure, in which the connector in an extended state.
Figure 5:
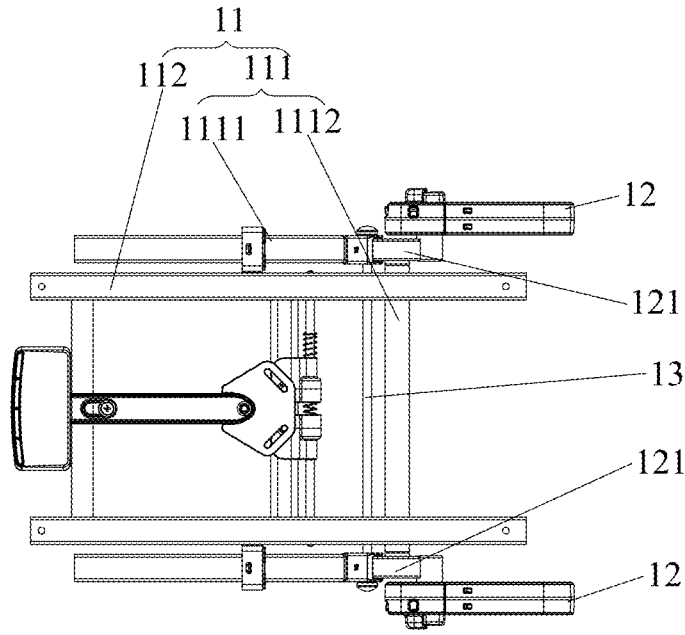
FIG. 5 is a schematic structural view of the connecting assembly of the present disclosure, in which the connector in a retracted state.
Figure 6:
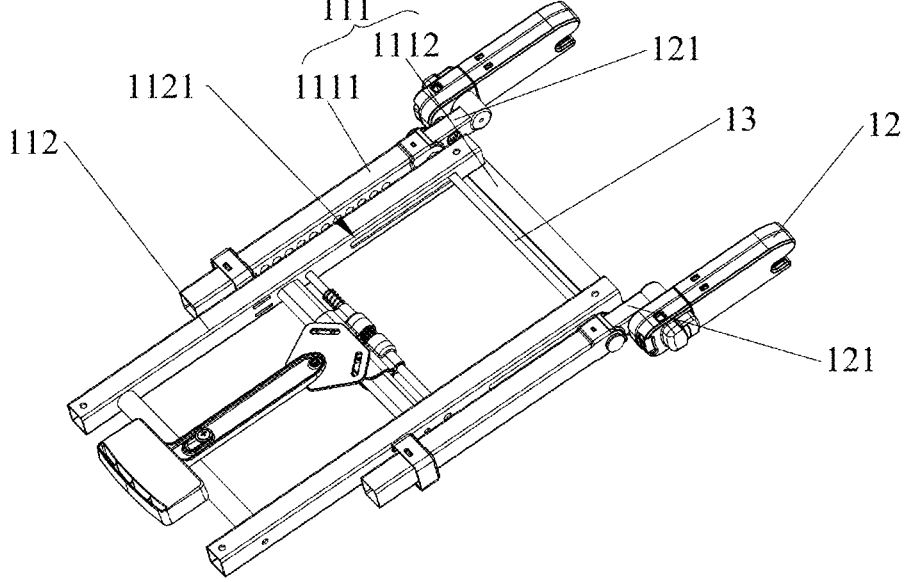
FIG. 6 is a schematic structural view of the connecting assembly of the present disclosure, in which the connector is in a reset position relative to a frame body.
Figure 7:
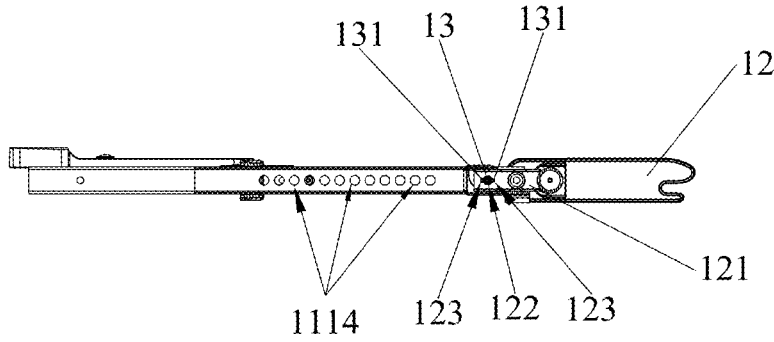
FIG. 7 is a schematic view showing the internal structure of FIG. 6 in a side view direction.
Figure 8:
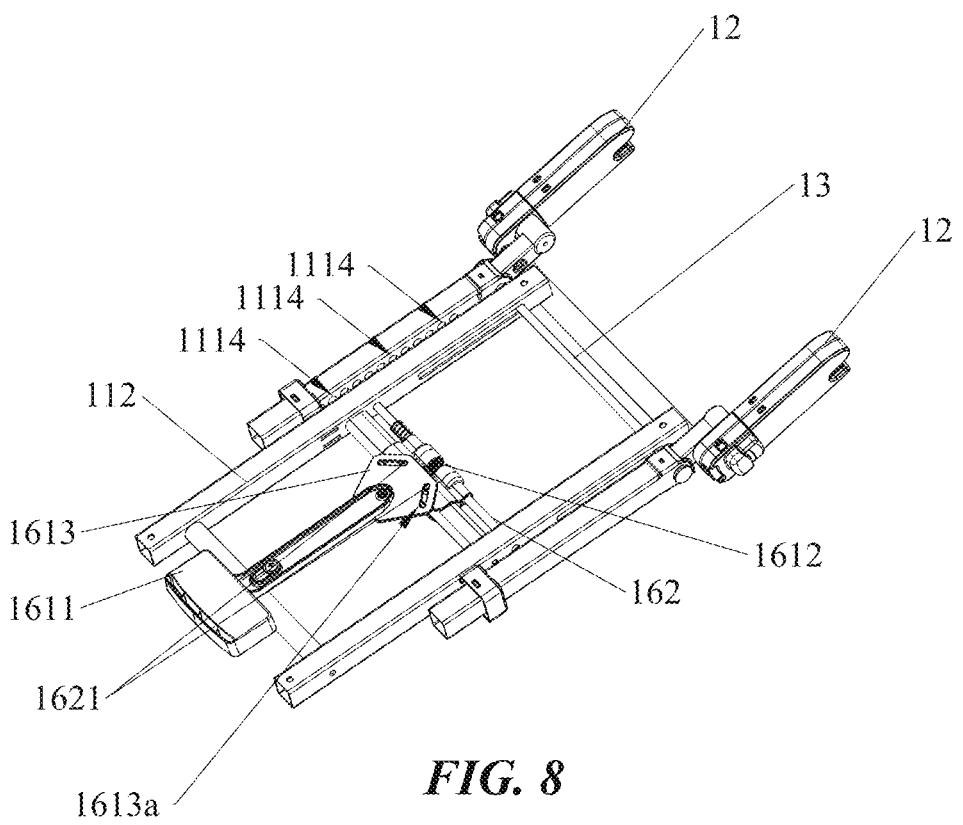
FIG. 8 is a schematic structural view of the connecting assembly of the present disclosure, in which the connector is in a work position relative to the frame body.
Figure 9:
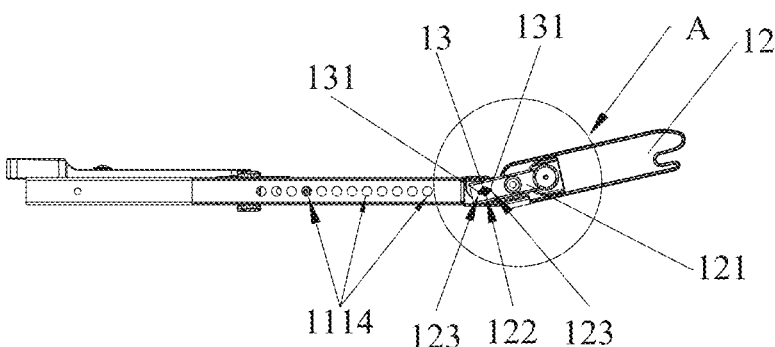
FIG. 9 is a schematic view showing the internal structure of FIG. 8 in a side view direction.
Figure 10:
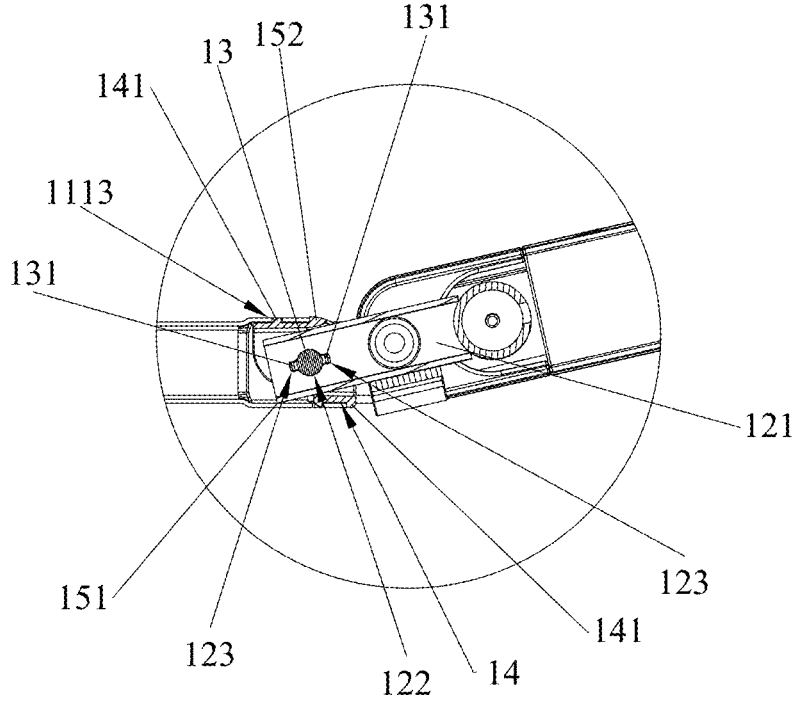
FIG. 10 is a partial enlarged view of portion A in FIG. 9.

As shown in FIG. 4 to FIG. 6, the connecting assembly 1 further includes a locking mechanism, and the frame body 11 further includes an inner frame body 112. The inner frame body 112 is located on the inner side of the two longitudinal bars of the outer frame body 111, and the inner frame body 112 may be moved relative to the outer frame body 111 along the length direction of the outer frame body 111. The locking mechanism is used to lock the relative position between the inner frame body 112 and the outer frame body 111. By virtue of adjustment of the relative position between the inner frame body 112 and the outer frame body 111, the whole length of the frame body 11 is adjusted, such that the connector 12 can be retracted to the seat body 2 or extended out of the seat body 2. The inner frame body 112 is provided with a guide hole 1121 along the sliding direction of the inner frame body 112. The pivot shaft 13 is inserted into the guide hole 1121 and is slidably arranged in the guide hole 1121. The arrangement of the guide hole 1121 can not only prevent the interference between the pivot shaft 13 and the inner frame body 112 when the pivot shaft 13 slides, but also guide the movement of the inner frame body 112.

As shown in FIG. 4 to FIG. 7, the locking mechanism includes a driving assembly 161 and a locking member 162. The driving assembly 161 is mounted on the inner frame body 112. The outer frame body 111 is provided with a plurality of locking holes 1114 along the length direction thereof. The locking member 162 is inserted into the inner frame body 112 and extended toward the locking hole 1114. The locking member 162 extends into any one of the locking holes 1114 under the driving of the driving assembly 161 to lock the relative position between the inner frame body 112 and the outer frame body 111. Specifically, the driving assembly 161 includes an operating member 1611, an elastic member 1612 and a driving plate 1613. The elastic member 1612 is arranged between two locking members 162, and the elastic member 1612 provides an elastic force for permanently forcing the locking member 162 to extend into locking hole 1114. One end of the driving plate 1613 is connected with the operating member 1611, and the other end of the driving plate 1613 is provided with an oblique hole 1613a. The locking member 162 has a guide column 1621 extending into the oblique hole 1613a. By pulling the operating member 1611, the guide column 1621 slides in the oblique hole 1613a and drives the locking member 162 against the elastic force of the elastic member 1612 to exit the locking hole 1114. And, by releasing the lock, the inner frame body 112 is allowed to move relative to the outer frame body 111. When the operating member 1611 is released, the locking member 162 is extended into the locking hole 1114 under the elastic restoring effect of the elastic member 1612, so as to achieve locking. The two locking members 162 are symmetrically arranged and the elastic member 1612 presses against between the two locking members 162 in an elastically compressed manner. Preferably, the oblique holes 1613a are symmetrically arranged, and the guide columns 1621 are symmetrically arranged, but are not limited thereto.

Figure 11:
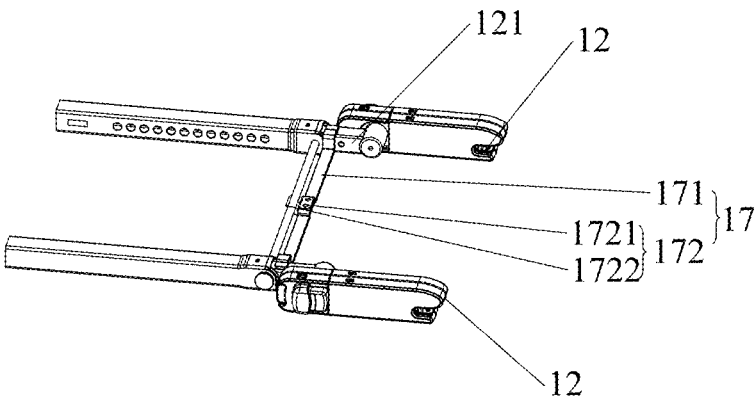
FIG. 11 is a schematic partial perspective view of the connecting assembly of the present disclosure, in which a locking assembly is added.

As shown in FIG. 11, the connecting assembly 1 further includes a locking assembly 17 which provides an elastic force for permanently forcing the connector 12 to rotate from the work position to the reset position. The locking assembly 17 includes a fixing member 171 and an elastic element 172. One end of the fixing member 171 is fixed to the connector 12. The elastic element 172 is connected with the fixing member 171, and the elastic element 172 is connected with the pivot shaft 13. The elastic element 172 provides an elastic force for permanently forcing the connector 12 to rotate from the work position to the reset position, so as to avoid the connector from shaking when the connector 12 rotates between the work position and the reset position. The elastic element 172 includes a connecting main body 1721 and a winding portion 1722. The connecting main body 1721 is connected with the fixing member 171. The winding portion 1722 is connected with the connecting main body 1721, and the winding portion 1722 wraps outside the pivot shaft 13 and provides an elastic force for rotating the pivot shaft 13. Preferably, the elastic element 172 has an elastic sheet structure.

In summarize, referring to FIG. 4 to FIG. 11, the assembly process of the baby seat 100 with the connecting assembly 1 of the present disclosure is described in detail below.

When in use, the operating member 1611 is pulled, and the guide column 1621 slides in the oblique hole 1613a and drives the locking member 162 to overcome the elastic force of the elastic member 1612 to exit the locking hole 1114. The inner frame body 112 is allowed to move relative to the outer frame body 111 by releasing the lock. When the operating member 1611 is released, the locking member 162 is extended into the locking hole 1114 under the elastic restoring effect of the elastic member 1612 so as to lock the relative movement between the inner frame body 112 and the outer frame body 111. When the baby is seated on the seat body 2, the rotation of the connector 12 relative to the frame body 11 allows the seat body 2 to move downwards relative to the connector 12. The seat body 2 can go down by a certain distance relative to the connector 12 under the baby's gravity, which may prevent the baby's head from colliding with the roof of the car and thereby achieve a protection effect.

By the arrangement of the frame body 11 and the connector 12, the frame body 11 is configured to connect with the seat body 2, the connector 12 is configured to connect with the car seat, and the connector 12 is movably connected with the frame body 11. That is, the connector 12 is movable relative to the frame body 11, for example, the connector 12 and the frame body 11 may be pivotally connected, or the connector 12 is elastically connected with the frame body 11 through the elastic member. The connector 12 may be moved relative to the frame body 11 to have the work position and the reset position. The connector 12 may be moved relative to the frame body 11 between the work position and the reset position. When the connector 12 is in the work position, the connector 12 angles with the frame body 11, such that the seat body 2, to which the frame body 11 is connected, may be moved downwards relative to the connector 12. That is, the connector 12 is allowed to be higher than the frame body 11, which overcomes the hard connection between the connecting assembly 1 and the car in the prior art. After the baby is seated, the seat body 2 can be moved down by a certain distance relative to the connector 12 under the baby's gravity, which may prevent the baby's head from colliding with the roof of the car and thereby may achieve the protection effect. When the connector 12 is in the reset position, the connector 12 flushes with the frame body 11, so as to achieve the purpose of reset and storage.

The above disclosure involves only to preferred examples of the present disclosure, which cannot limit the scope of the claims of the present disclosure. Therefore, equivalent changes made according to the scope of the claims of the present disclosure still fall into the scope covered by the present disclosure.

List of Element and Reference Number

100 baby seat
1 connecting assembly
11 frame body
111 outer frame body
1111 longitudinal bar
1112 transverse bar
1113 engagement opening
1114 locking hole
112 inner frame body
1121 guide hole
12 connector
121 connecting portion
122 pivot hole
123 engagement hole
13 pivot shaft
131 engagement lug
14 bushing
141 positioning protrusion
limiting assembly
151 first abutment portion
152 second abutment portion
locking mechanism
161 driving assembly
1611 operating member
1612 elastic member
1613 driving plate
1613a oblique hole
162 locking member
1621 guide column
17 locking assembly
171 fixing member
172 elastic element
1721 connecting main body
1722 winding portion
2 seat body.

What is claimed is:

1. A connecting assembly, comprising:

a frame body for connecting with a seat body, wherein the frame body has an outer frame body, and the outer frame body has an inner wall;

a connector for connecting with a car seat, the connector having a first abutment portion and an outer wall; and a bushing between the connector and the outer frame body of the frame body, wherein the bushing extends toward the connector to form a second abutment portion, the connector is movably connected with the frame body, and the connector is movable relative to the frame body such that the connector has a work position and a reset position, the connector angles with the frame body when the connector is in the work position, while the connector flushes with the frame body when the connector is in the reset position, motion of the connector relative to the frame body between the work position and the reset position allows the seat body, when connecting with the frame body, to move downwards relative to the connector, and when the connector is in the work position, the first abutment portion abuts against the inner wall of the outer frame body, and the second abutment portion abuts against the outer wall of the connector.

2. The connecting assembly according to claim 1, wherein the connector is an ISOFIX connector.

3. A baby seat comprising a seat body and a connecting assembly according to claim 1, the frame body being connected with the seat body.

4. The connecting assembly according to claim 1, wherein the connector is flexibly connected with the frame body.

5. The connecting assembly according to claim 4, wherein the connector is elastically connected with the frame body through an elastic member.

6. The connecting assembly according to claim 1, wherein the connector is pivotally connected with the frame body.

7. The connecting assembly according to claim 6, further comprising a pivot shaft, the connector having a connecting portion, and the connecting portion being pivotally connected with the outer frame body through the pivot shaft.

8. The connecting assembly according to claim 7, wherein an engagement opening is provided on the outer frame body, a positioning protrusion extends outwardly from the bushing to correspond to the engagement opening, and the positioning protrusion is engaged with the engagement opening.

9. The connecting assembly according to claim 7, further comprising a limiting assembly for restricting the motion of the connector to limit the connector in the work position.

10. The connecting assembly according to claim 9, wherein the limiting assembly includes the first abutment portion and the second abutment portion.

11. The connecting assembly according to claim 7, wherein an end of the pivot shaft extends radially outwardly to form an engagement lug, the connector is provided with a pivot hole through which the pivot shaft passes, and a side of the pivot hole is provided with an engagement hole corresponding to the engagement lug.

12. The connecting assembly according to claim 11, wherein engagement lugs are symmetrically arranged on both sides of the pivot shaft, and engagement holes are symmetrically provided on both sides of the pivot hole.

13. The connecting assembly according to claim 7, further comprising a locking mechanism, and the frame body further including an inner frame body located on an inner side of the outer frame body, the inner frame body being movable relative to the outer frame body along a length direction of the outer frame body, wherein the locking mechanism is configured to lock a relative position between the inner frame body and the outer frame body.

14. The connecting assembly according to claim 13, wherein the inner frame body is provided with a guide hole arranged along a sliding direction of the inner frame body, and the pivot shaft inserts in the guide hole and is slidably arranged in the guide hole.

15. The connecting assembly according to claim 13, wherein the locking mechanism includes a driving assembly and a locking member, the driving assembly is mounted on the inner frame body, the outer frame body is provided with a plurality of locking holes along the length direction thereof, the locking member inserts in the inner frame body and extends towards the locking hole, and wherein the locking member extends into any one of the locking holes under the driving of the driving assembly so as to lock the relative position between the inner frame body and the outer frame body.

16. The connecting assembly according to claim 15, wherein the driving assembly includes an operating member, an elastic member, and a driving plate, the elastic member is arranged on the locking member, the elastic member provides an elastic force for permanently forcing the locking member to extend into the locking hole, one end of the driving plate is connected with the operating member, another end of the driving plate is provided with an oblique hole, the locking member has a guide column extending into the oblique hole, and by virtue of pulling of the operating member, the guide column slides in the oblique hole and drives the locking member against an elastic force of the elastic member to exit the locking hole.

17. The connecting assembly according to claim 16, wherein the locking member includes two locking members that are symmetrically arranged, and the elastic member is abutted between the two locking members in an elastically compressed manner.

18. The connecting assembly according to claim 16, wherein the oblique hole includes oblique holes that are symmetrically arranged, and the guide column includes guide columns that are symmetrically arranged.

19. The connecting assembly according to claim 7, further comprising a locking assembly, wherein the locking assembly provides an elastic force for permanently forcing the connector to turn from the work position to the reset position.

20. The connecting assembly according to claim 19, wherein the locking assembly includes a fixing member and an elastic element, one end of the fixing member is fixed to the connector, the elastic element is connected with the fixing member, and the elastic element is connected with the pivot shaft, wherein the elastic element provides an elastic force for permanently forcing the connector to turn from the work position to the reset position.

21. The connecting assembly according to claim 20, wherein the elastic element includes a connecting main body connected with the fixing member, and a winding portion connected with the connecting main body, wherein the winding portion wraps outside the pivot shaft and provides an elastic force for rotating the pivot shaft.

22. The connecting assembly according to claim 20, wherein the elastic element is of an elastic sheet structure.

* * * * *